May 17, 1938. W. F. ZIMMERMANN 2,117,930
OUTBOARD SWIVEL SUPPORT
Filed Feb. 9, 1935 2 Sheets-Sheet 1

INVENTOR
William F. Zimmermann
BY
Nathan, Bowman & Helfrich
ATTORNEYS

May 17, 1938.    W. F. ZIMMERMANN    2,117,930
OUTBOARD SWIVEL SUPPORT
Filed Feb. 9, 1935    2 Sheets-Sheet 2

INVENTOR
William F. Zimmermann
BY
Nathan, Bowman + Helferich
ATTORNEYS

Patented May 17, 1938

2,117,930

UNITED STATES PATENT OFFICE 2,117,930

OUTBOARD SWIVEL SUPPORT

William F. Zimmermann, Maplewood, N. J., assignor to Gould & Eberhardt, Newark, N. J., a corporation of New Jersey Application February 9, 1935, Serial No. 5,721

4 Claims. (Cl. 90—1)

My invention concerns improvements in a machine tool of the type used for performing milling operations the inherent nature of which is to set up excessive side thrusts on the rotary supporting spindles. A gear hobbing machine is a machine of this type the general features of which include a spindle or arbor carrying the gear blank, or more often, a stack of gear blanks; and a related spindle or arbor carrying the cutter.

A machine of such type presents a problem in providing a satisfactory support for the outer end of the arbor, which is enhanced by the fact that to meet all conditions it is desirable to make such outer support adjustable to provide for different thicknesses of work and to keep the length of spindle between its supports as short as the conditions of the particular job or set-up will permit.

A related and particularly important problem involved in such outer spindle supports is that of providing some means of getting the journal out of the way to permit the ready removal of the cutter or the work blanks. I have heretofore developed an arbor support bearing construction which has proven of particular advantage in that it is carried on a rigid box-like supporting column but is swiveled thereon in a manner enabling it to be swung in an arc as a complete integral journal bearing, away from the outer spindle end, and leaving the latter entirely clear and free for the ready removal of objects mounted thereon. Such a construction is shown, for example, in my prior Patent No. 1,687,921 dated October 16, 1928.

To achieve the absolute rigidity under the severe strains developed it has been found desirable, however, to provide a support in which the outer spindle journal is carried on a member forming part of a closed frame work; and many and varied constructions have been proposed in the art to provide such form of rigid support, but difficulties have been encountered in such attempts resulting in the sacrifice of other important features desirable in a machine of the nature here concerned.

It is a primary object of my present invention to provide an absolutely rigid outer spindle support without sacrificing, but rather embodying, the advantages of the swiveled journal arrangement such as is illustrated in my prior patent mentioned above.

I term my invention an outboard swivel support and in accordance with the general principles thereof I provide a swiveled outboard journal for the arbor end which swivel construction is adjustably mounted on guideways on a normally rigid completely closed frame construction, the arrangement being such that the journal can be swung readily out of the way at any time as a complete bearing unit and without having to disturb the rigid closed frame construction.

By my arrangement I am able to avoid the use of such devices as split bearings with hinged members therefor, and of hinged and split supports, all of which offer inaccuracies through chips and dirt getting between the clamped surfaces and which are also lacking in rigidity through looseness in pivots and other defects of like nature characteristic of such constructions.

I also avoid the inconveniences and lack of permanency and rigidity present in constructions such as for milling machines in which a tie-bracket is employed to produce a closed frame construction, the tie-bracket being attached to the outboard journal bearing arm, and which must, therefore, be unclamped to permit adjustment or swiveling of the journal, and, in fact, entirely removed to permit free access to the outer spindle end. In my construction, as disclosed herein, the journal bearing is mounted in an arm slidable upon guideways of a rigid box-like column, one end of the column being permanently secured to the main frame and the other end being connected thereto by a strong tie-bar which is, in effect, a solid construction. The journal bearing arm, however, is capable of being slid off the end of the spindle or arbor and then swung in an arc about a large bearing away from the end of the arbor. As noted above, all this may be done without disturbing the permanent nature of the support for the outboard journal arm.

My invention embodies features of construction rendering it of simple, compact nature, as will be apparent from a more detailed examination thereof, such features combining to form a rigid support and one which can be quickly and easily adjusted to satisfy conditions of operation such as are present in a hobbing machine in which the invention is shown incorporated.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
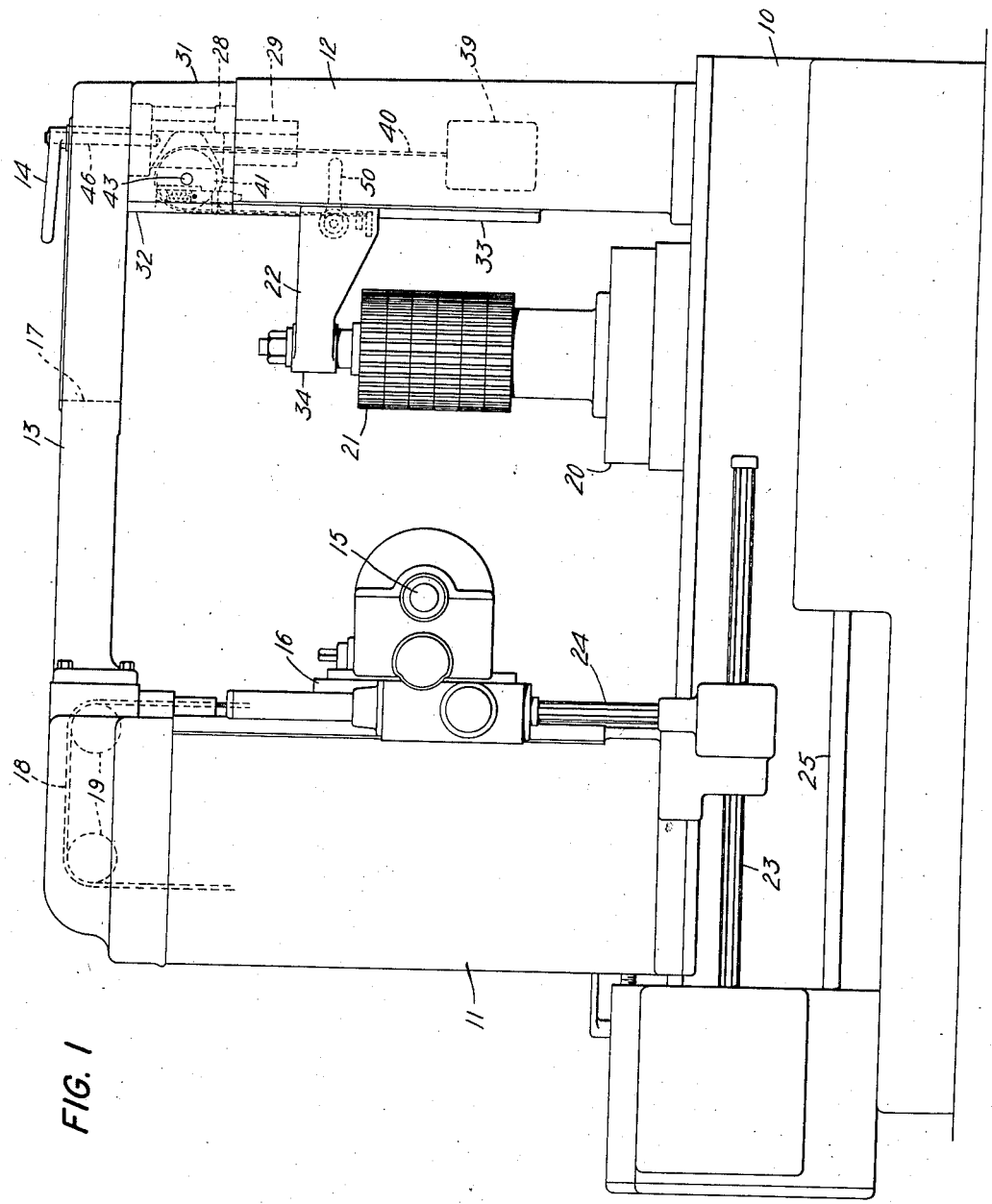
Fig. 1 is a general view in elevation of a hobbing machine incorporating the invention.
Figure 4:
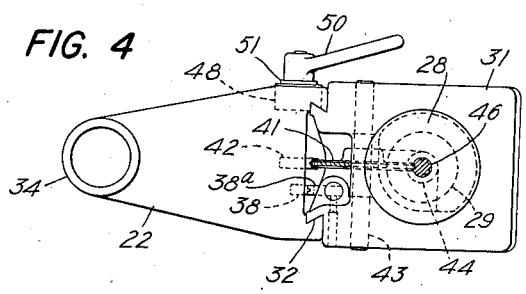
Fig. 4 is a top plan view of the arbor support on its mounting with the machine over-arm removed.
Figure 5:
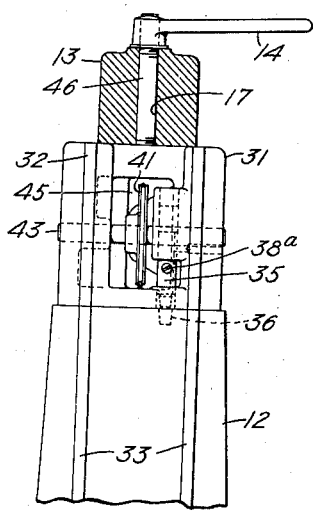
Fig. 5 is a view in elevation corresponding to Fig. 2 and looking from the left thereof but with the arbor supporting arm removed.

Figure 1 shows in a general way a hobbing machine, many of the parts of which may vary in accordance with heretofore well known designs and will not be described in great detail. The hobbing machine as there shown has a main frame which includes the base part 10 with a vertical box-like column 11 at the left which supports the hob and mechanism for driving it. There is also located at the right the box-like column or stanchion 12 which carries the outer journal bearing for the work-carrying arbor. The main supporting structure of the machine includes also the over-arm or tie member 13 rigidly connected to the top of the hob stanchion 11 and having a slidable connection with the upper end of the stanchion 12 but being normally clamped thereto through the clamping lever 14. The various members described form an outer rigid frame-work around an opening in which the hobbing operations are performed as will be apparent from an examination of Fig. 1. The stanchion 11 at the left carries the hob arbor 15, the hob mechanism being vertically translatable on the stanchion 11 through suitable vertical guideways thereon and also being adjustable in various other directions and manners on the hob supporting slide 16 in a manner well known in this type of machine. The hob stanchion 11 is adjustable on horizontal guideways toward and away from the work support arbor, this being provided for through the slot 17 of the over-arm 13 when the clamp 14 is released. The hob slide has a counterbalancing means, this being shown in part as including the flexible cable 18 extending over sheave wheels 19 to a weight suspended in the column 11.

The main base 10 supports also, adjacent the fixed vertical arm 12 a rotary plate 20 having a large journal bearing extending into the base 10 to provide a rigid structure capable of supporting the gear blanks mounted thereon and the heavy forces transmitted thereto. The gear blanks 21 are carried on suitable arbor means secured in the plate 20 and its extended bearings, the upper end of the work arbor projecting through, and being journaled in, the journal bracket 22 mounted on guideways on the vertical column 12. In normal operation hob and gear blanks are continuously rotated in proper relation to each other in a manner well understood by those versed in this art, the driving mechanism to the hob including the horizontal splined shaft 23 and the vertical splined shaft 24; and the drive to the work support being directed through the horizontal shaft 25 having a suitable driving connection with the lower end of the rotary work support. Driving mechanisms of this nature are well known in the art, one form of such being shown in somewhat more detail in my prior Patent #1,687,921, above noted.

The more specific details of my outboard swivel support for the journal bracket 22 will now be described for which reference may be had to Figs. 2 to 5. As shown particularly in Fig. 2 the upper end of the column 12 has formed therein a vertical bearing sleeve 27. A large cylindrical bearing stud 28 has a reduced portion 29 projecting down into the bearing sleeve 27. To provide a firm rigid means of securing the large bearing stud in the upper end of the column I prefer to employ a press-fit for the cylindrical portion 29 in the sleeve 27, the shoulder 30 of the bearing stud formed by the upper enlarged diameter resting on the upper surface of the column 12. Encircling the large portion 28 of the cylindrical bearing stud is a sleeve-like member 31 having guideways 32 on the side normally facing toward the hob stanchion 11, these guideways 32 being complementary to and normally in vertical alignment with the main guideways 33 of the column 12. The sleeve-like member 31, exteriorly, is made of substantially rectangular cross section to correspond with the outer surfaces of the strong box-like column 12.

The outboard journal bracket 22, it will be noted, is adapted to be shifted up and down vertically either onto the main guideways 33 of the main column, or onto the supplementary guideways 32 of the swivel support 31. In the lower position the bearing sleeve 34 engages over the outer end of the work arbor for rigidly supporting it. In the upper retracted position of the journal bracket 22 the bracket is supported wholly on the swivel mounting 31, as shown, for example, in Fig. 2, in which position, after being freed from the outer end of the arbor, it may be swung outward about the vertical stud 28 to a position such as that shown in Fig. 3.

Figure 2:
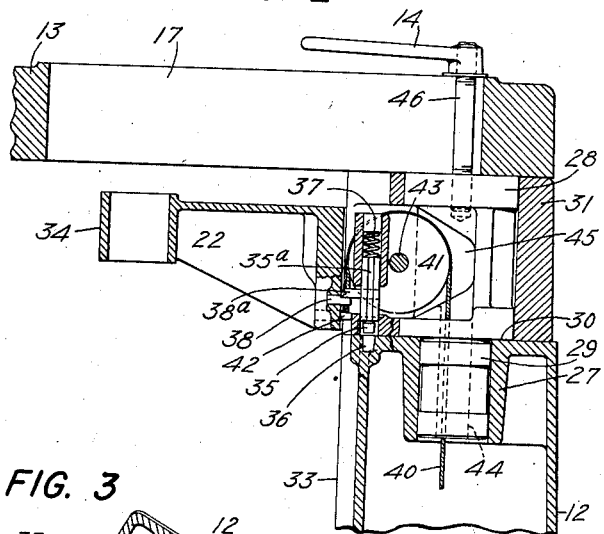
Fig. 2 is a fragmentary view showing the adjustable arbor support shifted to its upper position where it is carried on the swivelable support.
Figure 3:
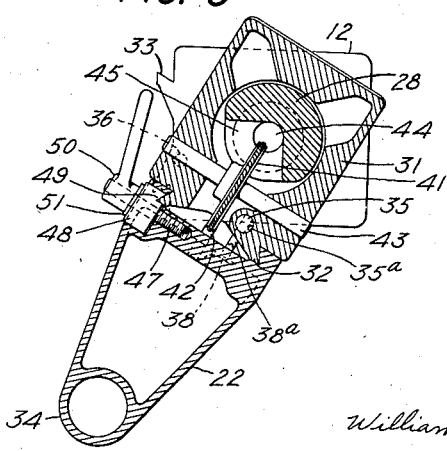
Fig. 3 is a cross sectional view through the arbor support and its swivelable mounting with the arbor support swung at an angle from its normal position adjacent the end of the arbor.

Normally, during working operation with the bracket in its lower position a vertical lock plunger 35 engages in an opening 36 in the upper surface of the column 12, being urged in that direction by the spring 37 shown best in Fig. 2. This locking occurs automatically, i. e., the lock bolt 35 engages when the bracket is down, but upon vertical shifting of the journal bracket 22 a pin 38, secured in the journal bracket, engages under a pin 38ª carried by the vertical shaft of the locking plunger 35 and simultaneously elevates it as the journal bracket proceeds into its upper position, as shown in Fig. 2, whereupon the swivel support is free to be swung on its vertical axis. A pin secured in the member 31 projects into a groove 35ª in the plunger 35 to maintain the latter in permanent angular position whereby the pin 38ª will remain in position to be engaged by lifting pin 38.

A counterbalance is provided for the journal bracket making it easy for manual shifting thereof, this counterbalancing means including a weight 39 movable vertically in the hollow interior of the column 12 and having a flexible cable 40 riding over the sheave 41 and the end opposite to the weight being secured to the pin 42 in the bracket 22. A cross pin 43 mounted in the swivel member 31 provides a support for the sheave wheel 41. A central hole 44 in the stud portion 29 allows the cable 40 to pass therethrough. The enlarged bearing part 28 has a central cutaway portion 45 adapted to receive the cable and also the edge of the sheave wheel 41, this cutaway portion extending through a horizontal angle of 90° or more and permitting the sheave 41 to be swung with the swivel support ample distance for the purpose required.

The clamp 14, heretofore mentioned for securing the overarm 13 to the upper end of the column 12, includes a stud 46 securely threaded into the upper end of the bearing stud 28. The vertical length of the stud 28 is slightly greater than the height of the sleeve of the swivel member 31 encircling it, and accordingly, when the overarm clamp 14 is drawn into engagement, the overarm or tie member 13 is clamped securely to the bearing stud 28 which in turn is secured in the upper end of the column 12 and the whole forms a very rigid closed support about which the swivel mounting 31 with the bracket 22 is free to swing. This can be, and normally is done, it should be noted, without loosening the clamp 14. In swinging the member 31 about its axis, together with the journal bracket 22, there is no necessity of disturbing in any manner the rigid support formed by the outer closed frame-work comprising the overarm 13 secured at its left end to the top of the hob stanchion 11, and then, through the rigid connecting means above described, to the vertical column 12, which in turn is fixedly mounted on the base 10.

The outboard journal bracket 22 is provided with means for clamping it on its guideways. Any suitable construction which will satisfactorily accomplish this purpose may be employed, one such means being shown in Fig. 3. The construction as there shown includes a stud 47 threaded into and normally fixed in the journal arm 22. This stud projects through a cylindrical clamp block 48 which has a notch 49 therein complemental to the adjacent guideway 33. A clamping nut 50 provided with a handle is threaded on the outer end of the stud 47 to draw the block 48 into engagement. A washer 51 is preferably inserted between the block 48 and clamp block 50.

It will be apparent that the outer end of the work arbor is at all times provided with a most rigid support well capable of withstanding the forces imposed thereon in the milling operations. At the same time this support can be readily and easily withdrawn to its uppermost position and then swung outwardly to free the outer end of the arbor and leaving it readily accessible thereby enabling the operator conveniently to remove the finished gear blanks from the outer end of the arbor, or to perform any of the other manipulations frequently necessary in machines of this general nature requiring free access to the outer end of an arbor or spindle. After the manual operation has been performed, such as the removal and replacement of gear blanks, the outboard support can be quickly and easily restored to its operative position. The journal support, it will be noted, is adjusted and swung to its various positions as a unit without disturbing its solid integral construction. The arrangement provided insures that the journal will be returned into rigid and accurate location and that no subsequent looseness of misalignment will occur such as frequently results where the journal is of a split or sectional construction and offers the opportunity of work chips or such foreign matter engaging between the surfaces. These operations of adjusting and swinging the outboard support into its various positions are accomplished, it will be observed, without releasing or disturbing in any manner the closed rigid support provided therefor by the present construction and arrangement of parts.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the appended claims.

Having thus revealed this invention, I claim as new and desire to secure to following combinations and elements, or equivalents thereof, by Letters Patent of United States:

1. A hobbing machine combining a main frame; an arm projecting therefrom, said arm having a reduced terminal portion affording spaced annular bearing surfaces and an outer supporting surface; said terminal portion being hollow and having an opening in the wall thereof intermediate said spaced bearing portions; a sleeve member rotatably mounted on said annular bearing surfaces and normally seating on the end of the arm adjacent the said terminal portion, said sleeve member being of a length slightly less than the length of said terminal portion; guideways formed on said arm; similar guideways formed upon said sleeve member opposite said annular bearing surfaces and in alignment with the guideways on the said arm; an arbor journal member mounted on said arm guideways and adapted to be shifted wholly to the guideways on said sleeve member and thereafter movable bodily angularly therewith; and a tie member extending from the main frame parts of the machine and seating upon the said outer supporting surface of said terminal portion; means for clamping said tie member to said terminal portion to form a rigid outer support for said arm, said last named means operating to effect said rigid connection without interfering with the rotatable functions of said arbor journal and sleeve member on the said terminal portion of the arm; and means operating through said lateral opening in the terminal portion and connected with said arbor journal for maintaining the latter in adjusted position on said arm or said sleeve guideways.

2. A hobbing machine combining a main frame; an arm projecting therefrom, said arm having a reduced terminal portion affording spaced annular bearing surfaces and an outer substantially closed supporting surface; a sleeve member rotatably mounted on said annular bearing surfaces and normally seating on the end of the said arm adjacent the said terminal portion; guideways formed on said arm; similar guideways formed upon said sleeve member opposite said annular bearing surfaces and in alignment with the guideways on the said arm; an arbor journal member mounted on said arm guideways and adapted to be shifted wholly to the guideways on said sleeve member and thereafter movable bodily angularly therewith; a tie member extending from the main frame parts of the machine bearing upon the said outer supporting surface of said terminal portion in spaced relation with the outer end of said sleeve; screw means threading into the substantially closed end of said terminal portion for clamping said tie member thereto to form a rigid outer support for said arm, said arbor journal and sleeve member being freely rotatable on said terminal portion irrespective of the clamped relation of said tie member with said terminal portion of said arm; and counterbalance means operating through registering lateral openings provided in said sleeve and in said terminal portion and connected with said arbor journal normally maintaining the latter in adjusted position on said arm guideways or on the guideways of said rotatable sleeve member.

3. In a hobbing machine combining a main frame; a pair of relatively adjustable spaced supporting arms projecting therefrom; one of said arms having a reduced terminal portion at its outer end; a tie member adapted to be firmly connected with the outer ends of said arms thereby forming a rigid box-like enclosure; a sleeve member rotatively mounted on said reduced terminal portion of said arm; aligned guideways formed on said sleeve and last mentioned arm; an arbor journal member slidable on said guideways and adapted to be shifted wholly to said sleeve member and thereafter movable bodily therewith in an angular direction about said terminal portion; counterbalance means for said arbor journal comprising a sheave wheel journaled in said sleeve member, a chain member operating on said wheel and connected at one end with said arbor journal member, said terminal portion of the arm being provided with a central bore and an opening in a lateral wall communicating therewith for receiving a portion of said sheave wheel and said chain; and a counterweight secured to the other end of said chain, said lateral opening in said terminal portion extending circumferentially approximately 90° from normal whereby said sleeve member, sheave wheel and counterweighted arbor journal may be freely swung out of the plane of said box-like enclosure.

4. A swivel support for an arbor journal in a machine tool combining a hollow arm projecting from the machine, said arm having a reduced terminal bearing portion affording an outer supporting surface and a pair of spaced annular bearing surfaces; a rigid supporting connection between said terminal bearing portion and main frame of the machine, said connection seating on said outer supporting surface of said terminal portion; a sleeve member rotatably mounted on said spaced annular bearing surfaces of said terminal portion and in spaced relation with said rigid connection; aligned guideways on said sleeve and arm members; an arbor journal adjustable on said guideways and adapted to be shifted wholly to said sleeve member and thereafter rotated bodily therewith; counterbalance means for said arbor journal comprising a sheave wheel pivoted within said sleeve, a chain operating over said wheel and connected with said arbor journal, said terminal bearing portion of said arm having an opening in a lateral wall intermediate said spaced annular bearings and extending circumferentially part way around said portion for receiving part of said sheave wheel and said chain, and a counterweight member operating in said hollow arm connected to said chain.

WILLIAM F. ZIMMERMANN.